United States Patent
Deng et al.

(10) Patent No.: US 11,481,081 B2
(45) Date of Patent: Oct. 25, 2022

(54) ELECTRONIC DEVICE

(71) Applicants: CHENGDU BOE OPTOELECTRONICS TECHNOLOGY CO., LTD., Sichuan (CN); BEIJING BOE TECHNOLOGY DEVELOPMENT CO., LTD., Beijing (CN)

(72) Inventors: Yin Deng, Beijing (CN); Chengwei Ji, Beijing (CN); Shiqi Chen, Beijing (CN)

(73) Assignees: Chengdu BOE Optoelectronics Technology Co., Ltd., Sichuan (CN); Beijing BOE Technology Development Co., Ltd., Beijing (CN)

(*) Notice: Subject to any disclaimer, the term of this patent is extended or adjusted under 35 U.S.C. 154(b) by 0 days.

(21) Appl. No.: 17/426,733

(22) PCT Filed: Jan. 6, 2021

(86) PCT No.: PCT/CN2021/070437
§ 371 (c)(1),
(2) Date: Jul. 29, 2021

(87) PCT Pub. No.: WO2021/139674
PCT Pub. Date: Jul. 15, 2021

(65) Prior Publication Data
US 2022/0100322 A1    Mar. 31, 2022

(30) Foreign Application Priority Data
Jan. 8, 2020 (CN) .......................... 202010017559.0

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0446* (2019.05); *G06F 3/04164* (2019.05)

(58) Field of Classification Search
CPC .. G06F 3/0448; G06F 3/0446; G06F 3/04164; G06F 3/0412
See application file for complete search history.

(56) References Cited

U.S. PATENT DOCUMENTS

2017/0307924 A1    10/2017    Liu et al.
2019/0102002 A1    4/2019     Lee et al.
(Continued)

FOREIGN PATENT DOCUMENTS

CN    105094495 A    11/2015
CN    107390920 A    11/2017
(Continued)

*Primary Examiner* — Peter D McLoone
(74) *Attorney, Agent, or Firm* — Chiwin Law LLC (57) ABSTRACT

An electronic device, including a touch screen. The touch screen includes a special-shaped touch region, and the special-shaped touch region includes multiple touch electrodes. The multiple touch electrodes include multiple first touch electrodes located in a non-edge region of the special-shaped touch region and multiple second touch electrodes located at an edge region of the special-shaped touch region; first edges of the multiple second touch electrodes coincide with the edge of the special-shaped touch region; the area ratios of the second touch electrodes to the first touch electrodes range from 0.9 to 1.1.

17 Claims, 4 Drawing Sheets

(56) References Cited

U.S. PATENT DOCUMENTS

2019/0265824 A1\* 8/2019 Abe .................... G06F 3/0443
2020/0210027 A1 7/2020 Ma et al.

FOREIGN PATENT DOCUMENTS

| CN | 108334245 A | 7/2018 |
|---|---|---|
| CN | 109656409 A | 4/2019 |
| CN | 109725771 A | 5/2019 |
| CN | 110597412 A | 12/2019 |

\* cited by examiner

ELECTRONIC DEVICE

This application is a U.S. National Phase Entry of International Application No. PCT/CN2021/070437, filed on Jan. 6, 2021, designating the United States of America and claiming priority to Chinese Patent Application No. 202010017559.0, filed on Jan. 8, 2020. The present application claims priority to and the benefit of the above-identified applications and the above-identified applications are incorporated by reference herein in their entirety.

TECHNICAL FIELD

At least one embodiment of the present disclosure relates to an electronic device.

BACKGROUND

At present, smart wearable devices, such as watches, Google glasses and bracelets, etc., are increasingly favored by consumers. These smart wearable devices not only have advantages of thin, stylish and intelligent, but also have touch performance. In addition, in order to meet the requirements of fashion and beauty, etc., the shapes of the touch screens of these smart wearable devices can include polygons, circles, rings and other shapes.

SUMMARY

At least one embodiment of the present disclosure provides an electronic device. The electronic device includes a touch screen and a display substrate. The touch screen includes a special-shaped touch region which includes a plurality of touch electrodes; and the display substrate includes a base substrate and a plurality of sub-pixels on the base. The plurality of touch electrodes include a plurality of first touch electrodes on a non-edge region of the special-shaped touch region and a plurality of second touch electrodes on an edge region of the special-shaped touch region, first edges of the plurality of second touch electrodes coincide with an edge of the special-shaped touch region, and an area ratio of each of the second touch electrodes to each of the first touch electrodes ranges from 0.9 to 1.1; and the display substrate includes a special-shaped display region, and an orthographic projection of the special-shaped display region on the base substrate coincides with an orthographic projection of the special-shaped touch region on the base substrate.

In some examples, a shape of the special-shaped touch region includes a circle, a ring or a polygon except a rectangle.

In some examples, the plurality of sub-pixels are arranged in an array along a first direction and a second direction, and the first direction intersects the second direction; and in each touch electrode, a ratio of a size along the first direction to a size along the second direction ranges from 9/11 to 11/9.

In some examples, the plurality of touch electrodes further include a plurality of third touch electrodes, an area ratio of each of the third touch electrodes to each of the first touch electrodes ranges from 0.9 to 1.1, and the plurality of third touch electrodes are between a part of the plurality of first touch electrodes and a part of the plurality of second touch electrodes.

In some examples, a shape of each of the sub-pixels is a rectangle, and two adjacent edges of each of the sub-pixels, which has a shape of rectangular, extend along the first direction and the second direction, respectively.

In some examples, a shape of each of the first touch electrodes is a square, and two adjacent edges of the square extend along the first direction and the second direction, respectively; and a shape of each of the third touch electrodes is a rectangle, and two adjacent edges of each of the third touch electrodes extend along the first direction and the second direction, respectively.

In some examples, each of the second touch electrodes further includes a second edge extending along the first direction and a third edge extending along the second direction.

In some examples, at least one of the plurality of second touch electrodes has a shape of non-rectangular.

In some examples, the first edge of at least one of the plurality of second touch electrodes has a shape of an arc or a straight line segment, and the straight line segment is not perpendicular to either the second edge or the third edge.

In some examples, a part of the plurality of first touch electrodes and a part of the plurality of third touch electrodes are arranged along at least one of the first direction and the second direction.

In some examples, the display substrate includes a plurality of common electrodes and common electrode lines electrically connected to respective common electrodes, respectively; the touch screen further includes touch signal lines electrically connected to respective touch electrodes, respectively; and the common electrodes are also used as the touch electrodes, and the common electrode lines are also used as the touch signal lines.

In some examples, the touch signal lines extend along the first direction, and an orthographic projection of a touch signal line, which is connected to a touch electrode, on the base substrate overlaps with an orthographic projection of the touch electrode on the base substrate.

In some examples, at least one of the plurality of touch electrodes includes a main body portion and a protrusion, and an orthographic projection of the protrusion on the base substrate overlaps with an orthographic projection of a corresponding touch signal line on the base substrate, so that the protrusion is electrically connected to and the touch signal line.

In some examples, a touch signal line, which overlaps with the main body portion, is insulated from the main body portion.

In some examples, shapes of respective first touch electrodes are identical, and areas of the respective first touch electrodes are equal.

In some examples, the edge of the special-shaped touch region has a shape of an arc, and the plurality of sub-pixels and the plurality of touch electrodes are both uniformly arranged along a circumferential direction of the arc.

In some examples, each of the touch electrodes includes a first edge extending along the circumferential direction of the arc and a second edge extending along a radial direction of the arc.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In the research, the inventor of the present disclosure found that shapes of touch screens of more and more smart wearable devices are no longer a rectangle, but a special-shaped shape, such as a circle, a ring or a polygon except the rectangle, so that a shape of a touch region in the touch screen is a special-shaped shape. Here, the "special-shaped shape" refers to a shape other than the rectangle, and the special-shaped shape can include a regular shape or an irregular shape. For example, an edge of the touch region with a special-shaped shape coincides with an edge of a display region with the same shape as that of the touch region, and assuming that a touch electrode structure with a rectangular shape is continuously adopted in the touch screen, there will be a problem that the shape of the touch electrode located at the edge of the touch region is difficult to design. For example, in the case where the edge of the special-shaped touch region is curved or broken-line-shaped, the touch electrode structure having a shape of rectangular cannot achieve good matching, which will cause the touch electrode located at the edge of the touch region to not completely cover the edge of the display region. For example, the touch electrodes at the edge of the touch region cannot completely cover the edge of the display region, or exceed the edge of the display region, or the touch electrodes cover the edge of the display region unevenly, which leads to the bad phenomena, such as the difficulty in ensuring the touch accuracy, inaccurate reporting points or poor linearity, etc.

Embodiments of the present disclosure provide an electronic device. The electronic device includes a touch screen and a display substrate. The touch screen includes a special-shaped touch region which includes a plurality of touch electrodes; the display substrate includes a base substrate and a plurality of sub-pixels located on the base substrate. The plurality of touch electrodes include a plurality of first touch electrodes on a non-edge region of the special-shaped touch region and a plurality of second touch electrodes on an edge region of the special-shaped touch region, first edges of the plurality of second touch electrodes coincide with an edge of the special-shaped touch region, and an area ratio of each of the second touch electrodes to each of the first touch electrodes ranges from 0.9 to 1.1; and the display substrate includes a special-shaped display region, and an orthographic projection of the special-shaped display region on the base substrate coincides with an orthographic projection of the special-shaped touch region on the base substrate. According to the embodiment of the present disclosure, the plurality of touch electrodes with areas as close as possible are designed in the touch screen with the special-shaped touch region, and the edge of the special-shaped display region coincides with the edge of the special-shaped touch region, so that the received signals of respective touch electrodes are consistent as much as possible, and the characteristics, such as sensitivity, touch accuracy, linearity and the like, of the edge of the special-shaped touch region corresponding to the edge of the special-shaped display region are improved while the accuracy of reporting points is improved.

The electronic device provided by the embodiment of the present disclosure will be described with reference to the accompanying drawings.

Figure 1:
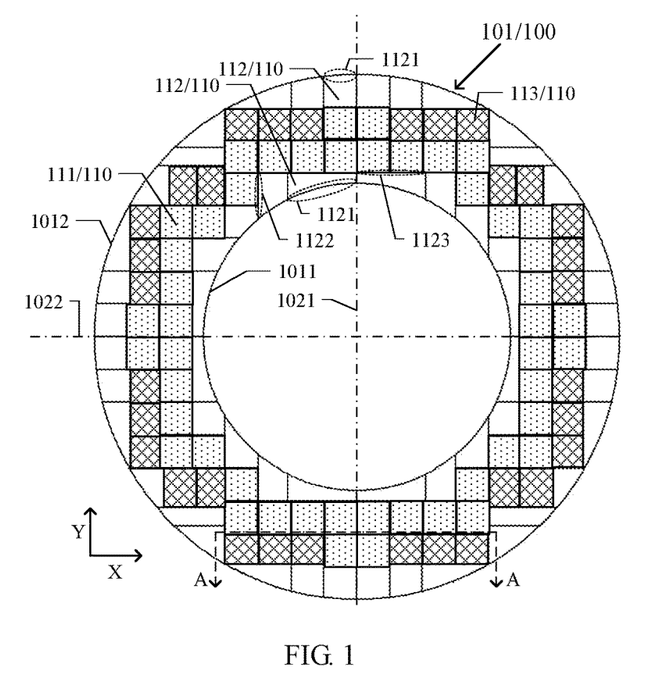
FIG. 1 is a schematic diagram of a plane structure of a touch screen of an electronic device provided by an example of an embodiment of the present disclosure.

FIG. 1 is a schematic diagram of a partial planar structure of an electronic device provided by an example of an embodiment of the present disclosure. As shown in FIG. 1, the electronic device includes a touch screen 100, and the touch screen 100 includes a special-shaped touch region 101. The example as shown in FIG. 1 takes the case that the shape of the special-shaped touch region 101 is a ring as an example, and the annular special-shaped touch region 101 includes an inner ring edge 1011 and an outer ring edge 1012. The embodiment of the present disclosure is not limited thereto, and the shape of the special-shaped touch region 101 can also be a regular shape, such as a circle or a polygon except a rectangle, or other special-shaped shapes, such as an irregular shape, etc., and the position of the edge of the special-shaped touch region is determined by its shape.

As shown in FIG. 1, the special-shaped touch region 101 includes a plurality of touch electrodes 110 insulated from each other, and the distribution shape of the plurality of touch electrodes 110 is the shape of the touch region 101. For example, as shown in FIG. 1, the plurality of touch electrodes 110 are arranged in a ring shape as a whole, so that the special-shaped touch region 101 is in a ring shape. The embodiment of the present disclosure is not limited thereto. In the case where the plurality of touch electrodes are arranged in a non-rectangular shape, such as a circle, etc., as a whole, the shape of the special-shaped touch region 101 is the corresponding non-rectangular shape.

As shown in FIG. 1, the plurality of touch electrodes 110 include a plurality of first touch electrodes 111 located on a non-edge region of the special-shaped touch region 101 and a plurality of second touch electrodes 112 located on an edge region of the special-shaped touch region 101. In the example shown in FIG. 1, the second touch electrodes 112 is located on an inner ring edge region and an outer ring edge region of the annular special-shaped touch region 101, and the first touch electrodes 111 is located on a region between the inner ring edge region and the outer ring edge region. The above-mentioned "non-edge region" and "edge region" are opposite, and the fact that the first touch electrode is located on the non-edge region of the special-shaped touch region means that the shortest distance between the first touch electrode and any edge of the special-shaped touch region is greater than zero.

As shown in FIG. 1, first edges 1121 of the plurality of second touch electrodes 112 coincide with an edge of the special-shaped touch region 101, that is, the first edges 1121 of the plurality of second touch electrodes 112 are the edge of the special-shaped touch region 101. For example, the first edges 1121 of the second touch electrodes 112 on the outer ring edge region of the special-shaped touch region 101 is the outer ring edge 1012 of the special-shaped touch region 101, while the first edges 1121 of the second touch electrodes 112 on the inner ring edge region of the special-shaped touch region 101 is the inner ring edge 1011 of the special-shaped touch region 101.

As shown in FIG. 1, an area ratio of each of the second touch electrodes 112 to each of the first touch electrodes 111 ranges from 0.9 to 1.1. For example, the area ratio of each of the second touch electrodes 112 to each of the first touch electrodes 111 ranges from 0.92 to 1. For example, the area ratio of each of the second touch electrodes 112 to each of the first touch electrodes 111 ranges from 0.93 to 0.98. For example, an area of at least one second touch electrode 112 is equal to an area of at least one first touch electrode 111.

For example, the areas of the respective first touch electrodes 111 in the plurality of first touch electrodes 111 are the same. For example, the shapes of the respective first touch electrodes 111 are the same and the areas of the respective first touch electrodes 111 are the same, so as to facilitate fabrication. In the case where the shapes of the respective first touch electrodes are the same and the areas of the respective first touch electrodes are the same, the consistency of the received signals of the respective first touch electrodes can be ensured, and the accuracy of reporting points can be improved.

For example, the areas of the plurality of second touch electrodes 112 are not completely the same, as long as the area ratio of each of the second touch electrodes 112 to each of the first touch electrodes 111 is in the range of 0.9 to 1.1.

For example, the shapes of the plurality of second touch electrodes 112 are not completely the same, and the shapes of the second touch electrodes 112 can be designed according to the positions and areas of the respective second touch electrodes 112 meeting the above characteristics.

For example, as shown in FIG. 1, the special-shaped touch region 101 includes a first center line 1021 extending along a Y direction, and two second touch electrodes 112 located on both sides of the first center line 1021 and symmetrical with respect to the first center line 1021 have the same shape and the same area. The special-shaped touch region 101 also includes a second center line 1022 extending along an X direction, and the two second touch electrodes 112 located on both sides of the second center line 1022 and symmetrical with respect to the second center line 1022 have the same shape and the same area. Therefore, the second touch electrode can be facilitated to be manufactured, and the uniformity of the touch electrode can be ensured.

For example, as shown in FIG. 1, in the case where the first touch electrode 111 is located in the same line as the second touch electrode 112, and the second touch electrode 112 is adjacent to the first touch electrode 111 (that is, there is no third touch electrode 113 mentioned later between the second touch electrode 112 and the first touch electrode 111), the area of the first touch electrode 111 and the area of the second touch electrode 112 may be equal, so that the signals received by the first touch electrode and the signals received by the second touch electrode are consistent, and the accuracy of touch reporting is improved.

The area ratio of each of the second touch electrodes to each of the first touch electrodes in the embodiment of the present disclosure ranges from 0.9 to 1.1, that is, the area of each of the second touch electrodes and the area of each of the first touch electrodes are as close as possible, so that the resistances of each touch electrode in the touch screen are as close as possible, thereby improving the touch accuracy and linearity of the special-shaped touch region.

For example, the touch screen provided by the embodiment of the present disclosure can be a self-capacitance touch screen, in which the plurality of touch electrodes, which are arranged on the same layer and insulated from each other, are connected to the driving circuit through touch signal lines, and when the touch electrodes are touched, the capacitance of the touch electrodes changes, and the driving circuit can judge the touch position according to the capacitance changes.

Figure 2:
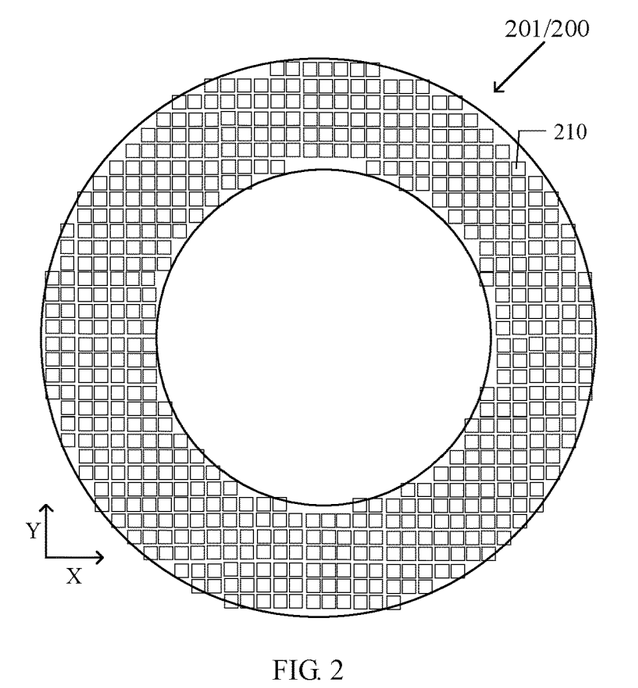
FIG. 2 is a schematic diagram of a plane structure of a display substrate in the electronic device as shown in FIG. 1.
Figure 3:
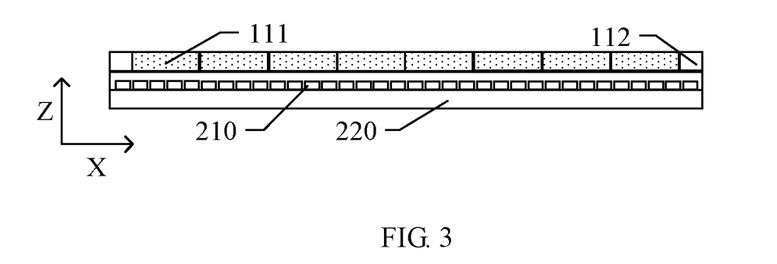
FIG. 3 is a schematic diagram of a cross-sectional structure of a part of film layers of the electronic device taken along AA line as shown in FIG. 1.

For example, FIG. 2 is a schematic diagram of a partial planar structure of a display substrate in the electronic device shown in FIG. 1, and FIG. 3 is a schematic diagram of a partial cross-sectional structure of the electronic device taken along the AA line shown in FIG. 1. As shown in FIGS. 1-3, the electronic device further includes a display substrate 200.

For example, as shown in FIG. 1-2, the display substrate 200 includes a special-shaped display region 201, which has the same shape as the special-shaped touch region 101, and the edge of the special-shaped display region 201 roughly coincides with the edge of the special-shaped touch region 101. That is, the edge of the special-shaped display region 201 coincides with the first edges 1121 of the second touch electrodes 112 in the special-shaped touch region 101. The display substrate 200 includes a base substrate 220, and an orthographic projection of the special-shaped display region 201 on the base substrate 220 coincides with an orthographic projection of the special-shaped touch region 101 on the base substrate 220. Here, the "coincidence" includes complete coincidence and approximate coincidence, and approximate coincidence means that the coincidence degree of the two is not less than 90%.

The example shown in FIGS. 1-2 takes the case that the shape of the special-shaped display region 201 is a ring as an example, but the embodiment of the present disclosure is not limited thereto, and the shape of the special-shaped display region 201 can also be a regular shape, such as a circle or a polygon except the rectangle, or other special-shaped shapes, such as an irregular shape, etc. In the case where the edge of the special-shaped display region 201 is curved, the first edges 1121 of the second touch electrodes 112 are also curved to match the edge of the special-shaped display region 201. In the case where the edge of the special-shaped display region 201 is a broken line, the first edges 1121 of the second touch electrodes 112 are also broken lines. That is, the shape of the first edges 1121 of the second touch electrodes 112 change according to the shape of the edge of the special-shaped display region.

For example, as shown in FIGS. 1-3, the special-shaped display region 201 includes a plurality of sub-pixels 210. The whole arrange shape of the plurality of sub-pixels 210 is a ring to form an annular display region 201. The sub-pixel 210 as shown in FIG. 2 represents the smallest unit of display, for example, one sub-pixel region. For example, the shape of the sub-pixel mentioned later can also represent the shape of the sub-pixel region.

For example, as shown in FIG. 3, the plurality of sub-pixels 210 are located on the base substrate 220. In an example of the embodiment of the present disclosure, the first touch electrode 111 and the second touch electrode 112 may be located on a side of the plurality of sub-pixels 210 away from the base substrate 220, that is, the touch screen is located on a display side of the display substrate.

For example, the sub-pixels in the embodiments of the present disclosure may include pixel electrodes, common electrodes, thin film transistors connected to the pixel electrodes and other structures, and the display substrate may be an array substrate.

For example, in an example, the display device including the display substrate may be a liquid crystal display device, and the liquid crystal display device further includes a liquid crystal layer and an opposing substrate located on a side of the liquid crystal layer away from the array substrate. The above touch screen can be located outside the liquid crystal display device (e.g., on cell structure) or inside the liquid crystal display device (e.g., in cell structure). For example, the touch screen can be located between the liquid crystal layer and the opposing substrate or the liquid crystal layer and array substrate.

For example, as shown in FIGS. 1-3, some sub-pixels 210 are arranged in an array along the first direction and the second direction, and some touch electrodes 110 are arranged in an array along the first direction and second direction. The first direction is the Y direction as shown in FIGS. 1-2, and the second direction is the X direction as shown in FIG. 1-2. Embodiments of the present disclosure are not limited thereto, and the first direction and the second direction may be interchanged. For example, the first direction and the second direction intersect. For example, the first direction and the second direction are perpendicular.

In the embodiment of the present disclosure, "the plurality of sub-pixels 210 are arranged in an array along the first direction and the second direction" means that some sub-pixels of the plurality of sub-pixels 210 are arranged in an array along the first direction and the second direction, and the overall arrangement shape of the plurality of sub-pixels 210 is a ring or other special-shaped shapes to form the special-shaped display region. In the embodiment of the present disclosure, "the plurality of touch electrodes 110 are arranged in an array along the first direction and the second direction" means that some touch electrodes of the plurality of touch electrodes 110 are arranged in an array along the first direction and the second direction, and the overall arrangement shape of the plurality of touch electrodes 110 is a ring or other special-shaped shapes to form the special-shaped touch region matched with the special-shaped display region.

In the embodiment of the present disclosure, the arrangement direction of the plurality of touch electrodes is approximately the same as that of the plurality of sub-pixels, and the first edge of the second touch electrode of the special-shaped touch region coincides with the edge of the special-shaped display region. Therefore, on one hand, the touch electrode can completely and uniformly cover the edge of the display region, and on the other hand, the touch electrode basically does not exceed the edge of the display region, thereby improving the touch sensitivity and linearity of the edge of the display region.

For example, as shown in FIGS. 1-3, the shape of each of the sub-pixels 210 is a first rectangle, and two adjacent edges of the first rectangle extend along the first direction and the second direction, respectively. For example, any two sub-pixels in the plurality of sub-pixels 210 have the same shape. For example, the shape of each of the sub-pixels 210 may be a square.

For example, as shown in FIGS. 1-3, the shape of each of the first touch electrodes 111 is a square, and two adjacent edges of the square extend along the first direction and the second direction, respectively. The shape of each of the first touch electrodes is set to be a square, which can ensure the induction when each of the first touch electrodes is touched by fingers, thus ensuring the sensitivity of each of the first touch electrodes.

The above-mentioned "square" can be a standard square or an approximate square, that is, a ratio of edge lengths of two adjacent edges of the square is greater than 95%.

For example, along at least one of the first direction and the second direction, the edge length of each of the first touch electrodes 111 is an integer multiple of the edge length of each of the sub-pixels 210, and each of the first touch electrodes 111 covers some sub-pixels 210.

For example, as shown in FIGS. 1-3, each of the second touch electrodes 112 further includes a second edge 1122 extending along the first direction (i.e., the Y direction) and a third edge 1123 extending along the second direction (i.e., the X direction).

For example, the shape of at least one second touch electrode 112 is non-rectangular.

For example, the first edge 1121 of the at least one second touch electrode 112 is a curved edge, and the second edge 1122 and the third edge 1123 are straight line segments. For example, all of the first edge 1121, the second edge 1122 and the third edge 1123 of the at least one second touch electrode 112 are straight line segments, and the first edge 1121 is not perpendicular to the second edge 1122 and the third edge 1123. In the embodiment of the present disclosure, by designing the shape of the second touch electrode to enable the shape of the second touch electrode different from the general rectangle, the edge of the special-shaped touch region can be matched with the edge of the special-shaped display region.

For example, along at least one of the first direction and the second direction, the edge length of each of the second touch electrodes 112 is an integer multiple of the edge length of each of the sub-pixels 210, and each of the second touch electrodes 112 covers some sub-pixels 210.

For example, as shown in FIG. 1, the plurality of touch electrodes 110 further include a plurality of third touch electrodes 113, and the area ratio of each of the third touch electrodes 113 to each of the first touch electrodes 111 ranges from 0.9 to 1.1. For example, the area ratio of each of the third touch electrodes 113 to each of the first touch electrodes 111 ranges from 0.92 to 1. For example, the area ratio of each of the third touch electrodes 113 to each of the first touch electrodes 111 ranges from 0.93 to 0.98. For example, the area of at least one third touch electrode 113 is equal to the area of at least one first touch electrode 111. Therefore, the area of each of the second touch electrodes, the area of each of the third touch electrodes and the area of each of the first touch electrodes in the embodiment of the present disclosure are relatively close, so that the signal received by each touch electrode is consistent, and the accuracy of touch reporting points is improved.

The area ratio of each of the third touch electrodes to each of the first touch electrodes in the embodiment of the present disclosure ranges from 0.9 to 1.1, that is, the areas of each of the third touch electrodes and each of the first touch electrodes are as close as possible, so that the resistances of each touch electrode in the touch screen are as close as possible, thereby improving the touch accuracy and linearity of the special-shaped touch region.

For example, the third touch electrode 113 is located between a part of the first touch electrodes 111 and a part of the second touch electrodes 112 so that the area ratio of each of the second touch electrodes 112 to each of the first touch electrodes 111 ranges from 0.9 to 1.1. The second touch electrodes are located at the edge of the special-shaped touch region, the selection of the shape and area of the adjacent second touch electrode is limited by the edge shape of the special-shaped display region. Therefore, the region between the part of the first touch electrodes and the part of the second touch electrodes needs to be provided with an adjusting touch electrode, that is, the third touch electrode for adjusting the shape of the part of the second touch electrodes, for example, adjusting the length ratio of the second edge and the third edge of the part of the second touch electrodes to ensure that the areas of all first touch electrodes are the same, and the area ratio of each of the second touch electrodes to each of the first touch electrodes ranges from 0.9 to 1.1.

For example, the third touch electrode 113 may be located on the non-edge region or the edge region. In the case where the third touch electrode 113 is located on the non-edge region, the distance between the third touch electrode 113 and any edge of the special-shaped touch region is greater than zero. In the case where the third touch electrode 113 is located on the edge region, the third touch electrode 113 may be located between two second touch electrodes 112, and one vertex of the third touch electrode 113 is located on the edge of the special-shaped touch region.

For example, as shown in FIG. 1, the shape of each of the third touch electrodes 113 is a second rectangle, and two adjacent edges of the second rectangle extend along the first direction and the second direction, respectively.

For example, the areas of the plurality of third touch electrodes 113 are not completely the same, as long as the area ratio of each of the third touch electrodes 113 to each of the first touch electrodes 111 is in the range from 0.9 to 1.1.

For example, the shapes of the plurality of third touch electrodes 113 are not completely the same, and the shapes of the third touch electrodes 113 can be designed according to the position and area of each of the third touch electrodes 113 meeting the above characteristics.

For example, as shown in FIG. 1, the special-shaped touch region 101 includes a first center line extending along the Y direction, and the shapes of the two third touch electrodes 113 located on both sides of the first center line and symmetrical with respect to the first center line are the same, and the areas of the two third touch electrodes 113 located on both sides of the first center line and symmetrical with respect to the first center line are the same; the special-shaped touch region 101 also includes a second center line extending along the X direction, and the two third touch electrodes 113 located on both sides of the second center line and symmetrical with respect to the second center line have the same shape and the same area. Therefore, the third touch electrode can be facilitated to be manufactured, and the uniformity of the touch electrode can be ensured.

For example, in the annular touch region 101 as shown in FIG. 1, in the case where the first touch electrode 111 and the third touch electrode 113 are located on the same line, the first touch electrode 111 is located on a middle position, and the third touch electrodes 113 are distributed on both sides of the first touch electrode 111. For example, the third touch electrodes 113 in the same line as the first touch electrode 111 have the same shape and the same area, and the area of each of the third touch electrodes 113 is smaller than the area of each of the first touch electrodes 111, so as to effectively adjust the shapes and areas of the second touch electrodes 112 adjacent to the first touch electrode 111 and the shapes and areas of the second touch electrodes 112 adjacent to the third touch electrodes 113.

For example, each of the third touch electrodes 113 covers some sub-pixels 210.

For example, along at least one of the first direction and the second direction, the edge length of each touch electrode 110 may be an even multiple of the edge length of each of the sub-pixels 210. FIG. 3 schematically shows that along the second direction, the edge length of the first touch electrode 111 is four times the edge length of the sub-pixel 210, but it is not limited thereto. The size relationship between each touch electrode and each of the sub-pixels may be determined according to the actual situation.

In the embodiment of the present disclosure, the areas of the respective touch electrodes are close, and along at least one of the first direction and the second direction, the edge length of each touch electrode is approximately an integer multiple of the edge length of the sub-pixel, and each touch electrode corresponds to a plurality of sub-pixels, so that the accuracy of the touch electrode can be ensured.

For example, as shown in FIGS. 1-3, the ratio of the sizes of each touch electrode 110 along the first direction and the second direction ranges from 9/11 to 11/9. That is, all of the ratio of the size of the first touch electrode 111 along the first direction and the second direction, the ratio of the size of the second touch electrode 112 along the first direction and the second direction, and the ratio of the size of the third touch electrode 113 along the first direction and the second direction along the first direction and the second direction range from 9/11 to 11/9, which can improve the sensing amount of each touch electrode when the touch electrodes 110 are touched by fingers, thereby ensuring the sensitivity of each touch electrode. Moreover, in the case where the ratio of the sizes of each touch electrode along the first direction and the second direction ranges from 9/11 to 11/9, it can also prevent touch disconnection and improve the linearity of the touch screen.

Figure 4:
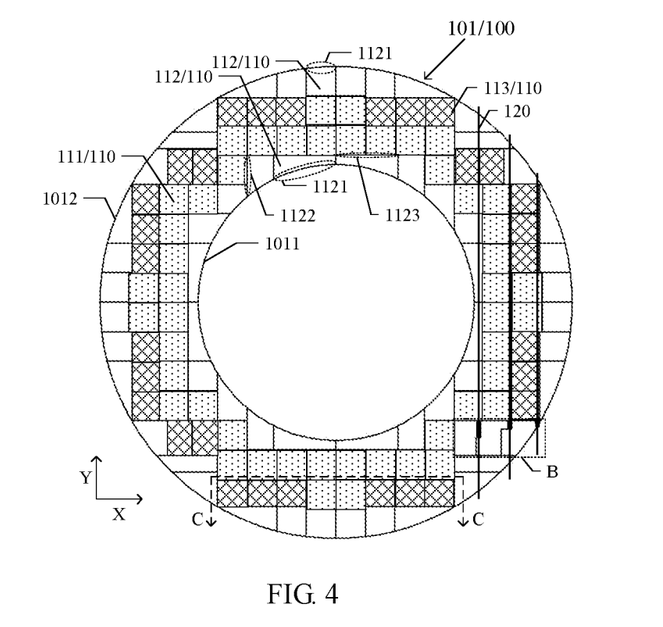
FIG. 4 is a schematic diagram of a partial planar structure of a touch screen in an electronic device provided by another example of an embodiment of the present disclosure.
Figure 5:
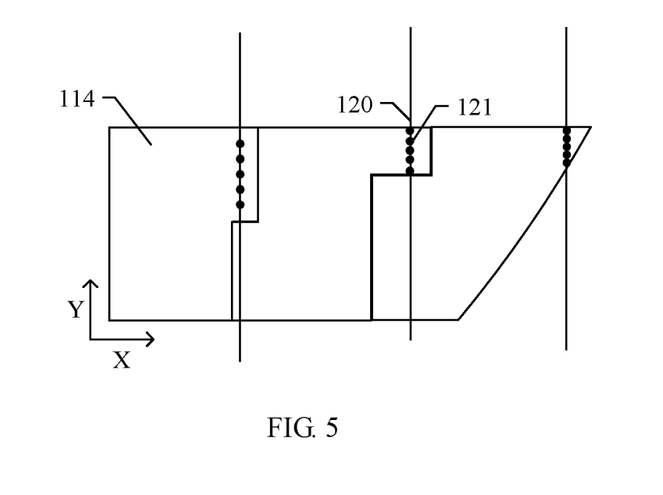
FIG. 5 is a schematic diagram of an enlarged structural at position B as shown in FIG. 4.
Figure 6:
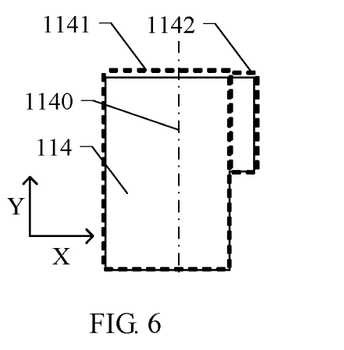
FIG. 6 is a schematic diagram of a plane structure of one touch electrode as shown in FIG. 5.
Figure 7:
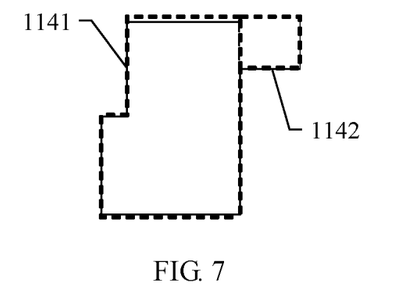
FIG. 7 is a schematic diagram of a plane structure of another touch electrode as shown in FIG. 5.

For example, FIG. 4 is a schematic diagram of a partial plane structure of a touch screen in an electronic device provided by another example of the embodiment of the present disclosure, FIG. 5 is a schematic diagram of an enlarged structural at position B as shown in FIG. 4, FIG. 6 is a schematic diagram of a plane structure of one touch electrode as shown in FIG. 5, and FIG. 7 is a schematic diagram of a plane structure of another touch electrode as shown in FIG. 5. The display substrate in this example may be the same as or different from the display substrate shown in FIG. 1. For example, in this example, a data line (not shown in the figure) for providing data signal for the pixel electrodes is also provided on the base substrate of the display substrate. The touch screen 100 in this example includes a plurality of touch electrodes 110 and touch signal lines 120 connected to the plurality of touch electrodes 110 in one-to-one correspondence. The shape of the special-shaped touch region 101 included in the touch screen 100 in this example may be the same as or different from the shape of the special-shaped touch region 101 as shown in FIG. 1. This example is described by taking the case that the shape of the special-shaped touch region 101 is the same as the shape of the special-shaped touch region 101 as shown in FIG. 1, and the special-shaped display region included in the display substrate is also the same as that shown in FIG. 1, as an example. For example, the touch electrodes 110 provided in the special-shaped touch region 101 in this example also include the first touch electrode 111, the second touch electrode 112 and the third touch electrode 113 as shown in FIG. 1. In this example, the area ratio of each of the second touch electrodes 112 to each of the first touch electrodes 111 ranges from 0.9 to 1.1, and the area ratio of each of the third touch electrodes 113 to each of the first touch electrodes 111 also ranges from 0.9 to 1.1.

For example, the touch screen shown in FIG. 4 can be a self-contained touch screen, and the electronic device including the touch screen as shown in FIG. 4 is an electronic device applying a touch and display driver integration (TDDI) technology.

For example, the display substrate includes a plurality of common electrodes and common electrode lines electrically connected to the common electrodes. In TDDI products, the common electrodes in the display substrate are also used as touch electrodes in the touch screen, and the common electrode lines in the display substrate are also used as touch signal lines, that is, the common electrodes and common electrode lines play a time-sharing multiplexing role. For example, an entire common electrode layer can be divided into a plurality of touch electrodes, and each touch electrode is connected to the signal output terminal through a touch signal line. The above signal output terminal can be a touch and display driver integration (TDDI) chip (not shown in the figure), which integrates touch sensing and display driver functions into a single chip. That is to say, the touch and display driver integration chip is connected to both data lines to output data signals and touch signal lines to output touch signals, which can improve the sensitivity of display screen sensing, solve the problem of high noise in the original display and touch chip separation system architecture, reduce the thickness of electronic devices, improve the light transmittance of display images of display substrate by reducing the amount of touch layers, and reduce the amount of components and process steps of external touch modules.

For example, an insulating layer is arranged between the touch electrode 110 and the touch signal line 120, and the touch electrode 110 can be electrically connected to the touch signal line 120 through a via hole in the insulating layer. In a display stage, the common electrode provides a reference voltage for the sub-pixels, and interacts with the pixel electrodes to drive the liquid crystal to deflect, thereby realizing pixel display; and in a touch stage, the common electrode is used as the touch electrode 110 for touch scanning to locate the touch point.

For example, in the display stage, the signal output terminal outputs a ground signal to the touch signal line, and in the touch stage, the signal output terminal outputs a touch signal to the touch signal line, and an initial voltage of the touch signal is a voltage of the ground signal. Because there is no difference between the initial voltages on the touch signal lines in the display stage and the touch stage, the voltages on the touch signal lines can be switched quickly at the same time when switching between the display stage and the touch stage, thus avoiding the occurrence of unstable voltages and improving the display and touch effects.

For example, the electronic device including the display substrate can be a liquid crystal display device, and the liquid crystal display device further includes a liquid crystal layer and an opposing substrate located on a side of the liquid crystal layer away from the base substrate. The touch electrode and the pixel electrode may both be located on the base substrate, that is, the touch electrode is located between the base substrate and the liquid crystal layer. For example, touch electrodes, touch signal lines, pixel electrodes, etc. can be arranged on a side of the base substrate facing the liquid crystal layer, and the touch signal lines are located on a side of the touch electrodes facing the base substrate, and the touch electrodes are electrically connected to corresponding touch signal lines through via holes in the insulating layer between the touch electrodes and the touch signal lines. The touch screen in the embodiment of the present disclosure is embedded in the liquid crystal display device, so that the electronic device can be thinner and lighter.

For example, in the embodiment of the present disclosure, in the case where the common electrode is also used as the touch electrode, the plurality of sub-pixels corresponding to one touch electrode share one common electrode, that is, one common electrode serves as both the smallest touch unit and the common electrode of the plurality of sub-pixels. Here, the sub-pixel represents the smallest display unit for display, and may include one pixel electrode, a part of one common electrode, a thin film transistor and other structures.

For example, FIG. 4 shows three touch signal lines 120 connected to three touch electrodes. The touch signal lines and data lines connected to the touch and display driver integration chip both extend along the first direction, and the touch signal lines are unevenly distributed between the data lines. For example, the touch signal lines correspondingly connected to the touch electrodes are not distributed between the touch electrodes, but located at a right side of the center line extending along the first direction of the touch electrodes. Because the touch signal lines are unevenly distributed, at this time, the touch signal lines, that should be connected to a certain touch electrode, do not overlap with the touch electrode, thereby resulting in that they are not electrically connected. It should be noted that the plurality of data lines are uniformly distributed, and dummy touch signal lines and actually used touch signal lines are distributed between the plurality of data lines. For touch screens using TDDI, the actually used touch signal lines will be selected according to the use needs, while the dummy touch signal lines will be vacant. Therefore, the touch signal lines mentioned in the embodiments of the present disclosure all refer to actually used touch signal lines, and the above-mentioned "uneven distribution of touch signal lines between data lines" refers to the uneven distribution of actually used touch signal lines between data lines. Of course, the dummy touch signal lines and the actually used touch signal lines can be uniformly distributed between the plurality of data lines to ensure uniformity.

In the special-shaped touch screen provided by the embodiment of the present disclosure, in order to ensure that the areas of the touch electrodes are close, it is possible that one or some of the touch electrodes do not overlap with the touch signal lines connected to them, thus causing the touch electrodes to fail to output touch signals.

To solve the problem that at least one touch electrode may not overlap with the corresponding touch signal line in the special-shaped touch region, as shown in FIGS. 4-6, at least one touch electrode, such as the fourth touch electrode 114, in an example of the embodiment of the present disclosure includes a main body portion 1141 and a protrusion 1142 as shown in FIGS. 6-7. An orthographic projection of the protrusion 1142 on the base substrate overlaps with an orthographic projection of the corresponding touch signal line 120 so that the protrusion 1142 is electrically connected to the touch signal line 120. Therefore, an orthographic projection of the touch signal line 120 connected to each touch electrode 110 on the base substrate overlaps with an orthographic projection of the touch electrode 110 on the base substrate. That is, the touch signal line 120 is electrically connected to the touch electrode 110 through a via hole 121 provided in a transparent insulating layer at the position where the touch signal line 120 overlaps with the corresponding touch electrode 110. The fourth touch electrode 114 in this embodiment can be at least one of the first touch electrode 111, the second touch electrode 112 and the third touch electrode 113, so that each touch electrode can be electrically connected to the corresponding touch signal line.

For example, as shown in FIGS. 5-7, the center line 1140 extending along the first direction of the touch electrode 110 passes through the main body portion 1141 of the touch electrode 110, and the protrusion 1142 of the touch electrode 110 overlaps with the touch signal line 120 connected to the touch electrode 110. Embodiments of the present disclosure do not limit the specific shapes of the main body portion and the protruding included in the touch electrode as long as the above positional relationship is satisfied. The "center line" in the above-mentioned "center line of the touch electrode 110 extending along the first direction" refers to the center line passing through a center of the orthographic projection of the touch electrode on a straight line extending along the second direction.

For example, as shown in FIGS. 5-7, the center line of the fourth touch electrode 114 along the first direction passes through the main body portion 1141 included in the fourth touch electrode 114, and the protrusion 1142 is located at a side of the main body 1141. For example, in the case where the orthographic projection of the touch signal line 120 on the touch electrode 110, which is connected to the touch signal line 120, is located on a right part of the touch electrode 110, the protrusion 1142 is located on a right side of the main body portion 1141.

For example, the fourth touch electrode 114 may be polygonal, including a plurality of fourth edges extending along the first direction and a plurality of fifth edges extending along the second direction. By adjusting the length of each fourth edge and each fifth edge, the area ratio of the fourth touch electrode 114 to each of the first touch electrodes 111 can be ensured to be in the range from 0.9 to 1.1, so as to ensure the accuracy of reporting points, touch accuracy and sensitivity of the touch screen.

For example, as shown in FIGS. 5-7, in order to ensure that the area ratio of the fourth touch electrode 114 to each of the first touch electrodes 111 ranges from 0.9 to 1.1, one of two adjacent fourth touch electrodes 114 overlaps with the touch signal line 120 connected to the other fourth touch electrode 114, and the overlapping part is the main body portion 1141 of the fourth touch electrode 114. That is, the touch signal line 120 overlapping the main body portion 1141 of the fourth touch electrode 114 is insulated from the main body portion 1141.

For example, as shown in FIG. 5, at least five via holes 121 may be provided between each touch signal line 120 and the corresponding touch electrode 110 to reduce resistance and ensure connection reliability.

Figure 8:
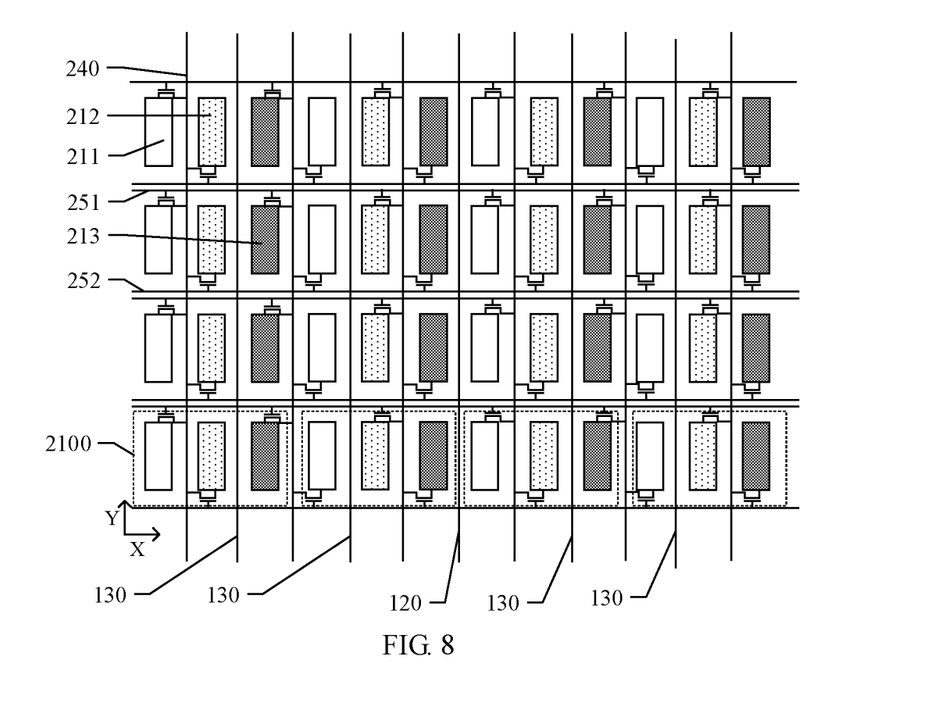
FIG. 8 is a schematic diagram of a positional relationship among touch signal lines of the electronic device and sub-pixels and data lines in the display substrate as shown in FIGS. 4-7.

FIG. 8 is a schematic diagram of the positional relationship among the touch signal lines as shown in FIGS. 4-7 and the sub-pixels and data lines in the display substrate. FIG. 8 is a schematic diagram of a partial structural of a dual-gate electronic device integrating touch and display driver. As shown in FIG. 8, the electronic device includes a plurality of sub-pixels arranged in an array along the X direction (row direction) and the Y direction (column direction), and the plurality of sub-pixels may include a red sub-pixel 211, a green sub-pixel 212 and a blue sub-pixel 213. The red sub-pixel 211, the green sub-pixel 212 and the blue sub-pixel 213 as shown in FIG. 8 refer to the pixel electrode of each color sub-pixel. The electronic device also includes a data line 240 extending along the Y direction and a first gate line 251 and a second gate line 252 extending along the X direction, and two columns of sub-pixels are arranged between two adjacent data lines 240, and the first gate line 251 and the second gate line 252 are respectively located on both sides of each row of sub-pixels along the Y direction. Sub-pixels located on both sides of any data line 240 and adjacent to the data line 240 are connected to the data line 240. For example, the red sub-pixel 211 and the green sub-pixel 212 (or blue sub-pixel 213) adjacent to the red sub-pixel 211 are connected to the data line 240 between the red sub-pixel 211 and the green sub-pixel 212 (or blue sub-pixel 213) adjacent to the red sub-pixel 211. Different sub-pixels connected to the same data line 240 are connected to different gate lines. For example, among the sub-pixels arranged along the X direction, one of the two sub-pixels connected to the same data line 240 is connected to the first gate line 251 and the other of the two sub-pixels is connected to the second gate line 252.

For example, as shown in FIG. 8, a plurality of dummy touch signal lines 130 and actually used touch signal lines 120 are distributed between the plurality of data lines 240. the above-mentioned "dummy touch signal lines 130 and actually used touch signal lines 120" are collectively referred to as touch signal lines, and the plurality of data lines 240 and touch signal lines are arranged alternately along the second direction, and only one data line 240 or one touch signal line is arranged between adjacent sub-pixels 210. That is, there are two columns of pixels 210 and one touch signal line, which is between the two columns of sub-pixels 210, between adjacent data lines 240. Two columns of sub-pixels 210 and one data line 240, which is between the two columns of sub-pixels 210, are disposed between adjacent touch signal lines.

For example, as shown in FIG. 8, taking the case that the red sub-pixel 211, the green sub-pixel 212 and the blue sub-pixel 213 constitute one pixel 2100 as an example, the touch signal line 120 is only located between adjacent pixels 2100 to prevent the display of each pixel from being affected.

Figure 9:
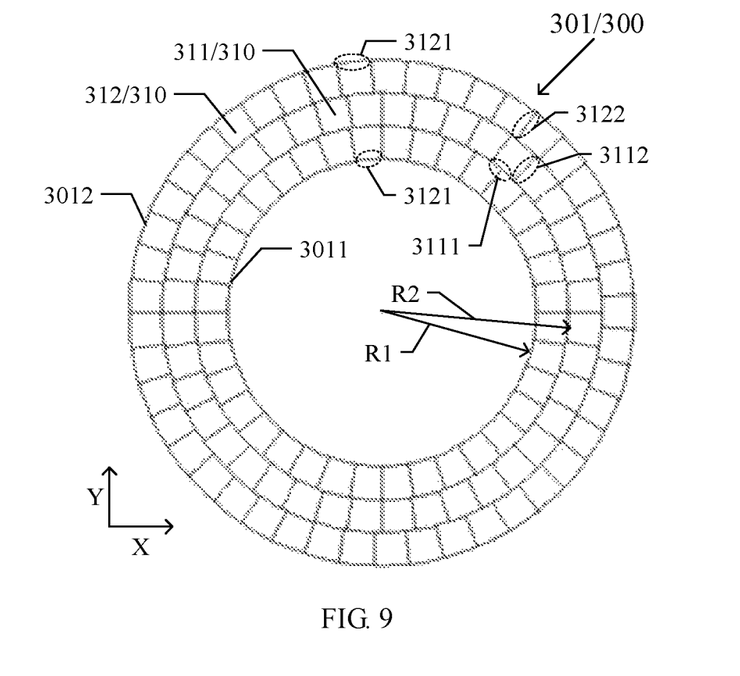
FIG. 9 is a schematic diagram of a plane structure of a touch screen of an electronic device provided by another example of the embodiment of the present disclosure.
Figure 10:
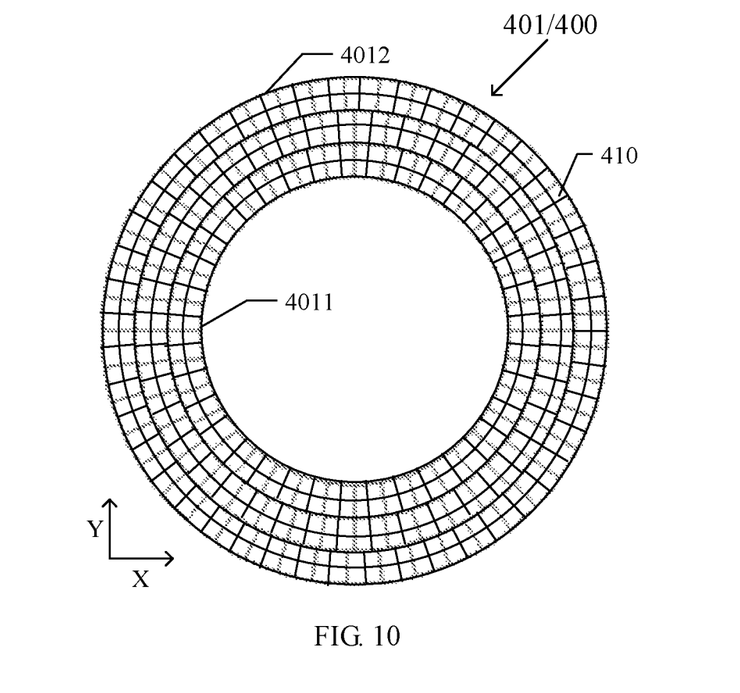
FIG. 10 is a schematic diagram of a partial planar structure of a display substrate in the electronic device as shown in FIG. 9.

FIG. 9 is a schematic diagram of a partial planar structure of an electronic device provided by another example of the embodiment of the present disclosure, and FIG. 10 is a schematic diagram of a partial planar structure of a display substrate in the electronic device as shown in FIG. 9. As shown in FIG. 9, the electronic device includes a touch screen 300, and the touch screen 300 includes a special-shaped touch region 301.

As shown in FIG. 9, the special-shaped touch region 301 includes a plurality of touch electrodes 310 insulated from each other, and the distribution shape of the plurality of touch electrodes 310 is the shape of the touch region 301.

For example, as shown in FIG. 9, the shape of the special-shaped touch region 301 includes an arc, and the plurality of touch electrodes 310 are uniformly distributed along a circumferential direction of the arc. For example, the plurality of touch electrodes 310 are arranged in a ring as a whole, the shape of the special-shaped touch region 301 is a ring. The example shown in FIG. 9 takes the case that the shape of the special-shaped touch region 301 is a ring as an example, and the annular special-shaped touch region 301 includes an inner ring edge 3011 and an outer ring edge 3012. The embodiment of the present disclosure is not limited thereto, and the shape of the special-shaped touch region 301 can also be a circle, and the position of the edge of the special-shaped touch region is determined by its shape.

For example, as shown in FIG. 9, the plurality of touch electrodes 310 include a plurality of first touch electrodes 311 located in a non-edge region of the special-shaped touch region 301 and a plurality of second touch electrodes 312 located in an edge region of the special-shaped touch region 301. In the example as shown in FIG. 9, the second touch electrode 312 is located in an inner ring edge region and an outer ring edge region of the annular shaped touch region 301, and the first touch electrode 311 is located in a region between the inner ring edge region and the outer ring edge region. The above-mentioned "non-edge region" and "edge region" are opposite, and the fact that the first touch electrode is located in the non-edge region of the special-shaped touch region means that the shortest distance between the first touch electrode and any edge of the special-shaped touch region is greater than zero.

For example, as shown in FIG. 9, the first edges 3121 of the plurality of second touch electrodes 312 coincide with an edge of the special-shaped touch region 301, that is, the first edges 3121 of the plurality of second touch electrodes 312 are the edge of the special-shaped touch region 301. For example, the first edges 3121 of the plurality of second touch electrodes 312 located in the outer ring edge region of the special-shaped touch region 301 are the outer ring edge 3012 of the touch region 301, while the first edges 3121 of the plurality of second touch electrodes 312 located in the inner ring edge region of the special-shaped touch region 301 is the inner ring edge 3011 of the touch region 301. FIG. 9 schematically shows that the touch electrode 310 includes two circles of second touch electrodes 312 located at the inner edge and outer edge of the ring respectively, and one circle of first touch electrodes 311 located between the two circles of second touch electrodes 312. The embodiment of the present disclosure is not limited thereto, and the first touch electrodes between two circles of second touch electrodes may include two or more circles.

For example, as shown in FIG. 9, each touch electrode 310 includes a first edge extending along the circumferential direction of the arc and a second edge extending along the radial direction of the arc. For example, the first touch electrode 311 includes a first edge 3111 extending along the circumferential direction of the arc and a second edge 3312 extending along the radial direction of the arc. For example, the second touch electrode 312 includes a first edge 3121 extending along the circumferential direction of the arc and a second edge 3122 extending along the radial direction of the arc.

As shown in FIG. 9, the area ratio of each of the second touch electrodes 312 to each of the first touch electrodes 311 ranges from 0.9 to 1.1. For example, the area ratio of each of the second touch electrodes 312 to each of the first touch electrodes 311 ranges from 0.92 to 1. For example, the area ratio of each of the second touch electrodes 312 to each of the first touch electrodes 311 ranges from 0.93 to 0.98. For example, the area of at least one second touch electrode 312 is equal to the area of at least one first touch electrode 311.

For example, the areas of respective first touch electrodes 311 are the same. For example, the shapes of the first touch electrodes 311 are the same and the areas of the first touch electrodes 311 are the same to facilitate fabrication. In the case where the shapes of the first touch electrodes are the same and the areas of the first touch electrodes are the same, the consistency of the received signal of each of the first touch electrodes can be ensured, and the accuracy of reporting points can be improved.

For example, as shown in FIG. 9, the areas of the second touch electrodes 312 located in the same circle are all the same to facilitate fabrication. In the case where the shapes of the second touch electrodes are the same and the areas of the second touch electrodes are the same, the consistency of the received signal of each of the second touch electrodes can be ensured, and the accuracy of reporting points can be improved.

For example, in the actual manufacturing process of the touch electrodes, the preset size of each touch electrode can be set as a*b (taking the case that the shape of the touch electrode is a rectangle as an example). For example, the shape of each touch electrode may be approximately a square, which is an approximate square and includes two curved edges extending along an axial direction of the annular touch region and two straight edges extending along a radial direction of the annular touch region. For example, the size of each touch electrode can be 5 mm*5 mm, 6 mm*6 mm or 7 mm*7 mm. The annular touch region is divided according to the preset size of each touch electrode, for example, the area S of each touch electrode satisfies a relationship of $(\pi R2^2-\pi R1^2)*(A/360)=S$. The above-mentioned A refers to an angle occupied by each touch electrode on the ring, R1 and R2 respectively refer to a length of two first edges extending along the circumferential direction of the ring from the center of the ring to any circle of touch electrodes, and the difference between R1 and R2 is the length of the second edge, extending along the radial direction of the ring, of touch electrode. According to the area S, R1 and R2 of each touch electrode, the angle A occupied by each touch electrode on the ring can be calculated, so that the ring-shaped touch region (including edge region and non-edge region) can be evenly divided to obtain each touch electrode with approximate area, thus ensuring the uniform induction of each touch electrode and improving the linearity of the edge of the touch region.

The area ratio of each of the second touch electrodes to each of the first touch electrodes in the embodiment of the present disclosure ranges from 0.9 to 1.1, that is, the areas of each of the second touch electrodes and each of the first touch electrodes are as close as possible, so that the resistances of respective touch electrodes in the touch screen are as close as possible, thereby improving the touch accuracy and linearity of the special-shaped touch region.

For example, as shown in FIGS. 9-10, the electronic device further includes a display substrate 400. The touch screen 300 is located on a display side of the display substrate 400, that is, the touch screen 300 is located on a side of the display substrate 400 for display. In the case where the display substrate 400 displays an image, the image light passes through the touch screen 300 and then exits.

For example, as shown in FIG. 9-10, the display substrate 400 includes a special-shaped display region 401, which has the same shape as the special-shaped touch region 301, and the edge of the special-shaped display region 401 and the edge of the special-shaped touch region 301 roughly coincide. That is, the edge of the special-shaped display region 401 coincides with the first edges 3121 of the second touch electrodes 312 in the special-shaped touch region 301. The display substrate 400 includes a base substrate, and the orthographic projection of the special-shaped display region 401 on the base substrate coincides with the orthographic projection of the special-shaped touch region 301 on the base substrate.

The example as shown in FIGS. 9-10 takes the case that the shape of the special-shaped display region 401 is a ring as an example, but the embodiment of the present disclosure is not limited thereto, and the shape of the special-shaped display region 401 may also be a circle. In the case where the edge of the special-shaped display region 401 is curved, the first edges 3121 of the second touch electrodes 312 are also curved to match the edge of the special-shaped display region 401. That is, the shape of the first edges 3121 of the second touch electrodes 312 changes according to the shape of the edge of the special-shaped display region.

For example, as shown in FIGS. 9-10, the special-shaped display region 401 includes a plurality of sub-pixels 410. The shapes of the plurality of sub-pixels 410 are approximately the same, and areas of the plurality of sub-pixels 410 are approximately the same. The whole shape of the plurality of sub-pixels 410 is a ring to form an annular special-shaped display region 401. A sub-pixel 410 as shown in FIG. 10 is a pixel electrode included in the sub-pixel.

For example, as shown in FIG. 9-10, the special-shaped display region 401 has a shape of an arc, and the plurality of sub-pixels 410 are uniformly distributed along the circumferential direction of the arc. That is, the plurality of sub-pixels 410 and the plurality of touch electrodes 310 are uniformly distributed along the circumferential direction of the arc.

In the embodiment of the present disclosure, the arrangement direction of the plurality of touch electrodes is approximately the same as the arrangement direction of the plurality of sub-pixels, and the first edges of the second touch electrodes of the special-shaped touch region coincide with the edge of the special-shaped display region. Therefore, on one hand, the touch electrode can completely and uniformly cover the edge of the display region, and on the other hand, the touch electrode basically does not exceed the edge of the display region, thereby improving the touch sensitivity and linearity of the edge of the display region.

For example, the special-shaped display region 401 may include a plurality of circles of sub-pixels 410, and FIG. 9 schematically shows that the special-shaped display region 401 includes six circles of sub-pixels 410. The embodiment of the present disclosure includes but is not limited thereto, and the amount of sub-pixels is determined according to the needs of actual products.

For example, as shown in FIGS. 9-10, each touch electrode 310 covers some sub-pixels 410. FIGS. 9-10 schematically show that each touch electrode covers 4 sub-pixels, but are not limited thereto. The amount relationship between touch electrodes and sub-pixels is determined according to the needs of actual products.

For example, the electronic device shown in this example can also be an electronic device adopting a touch and display driver integration mode. For example, the touch screen in this example can be a self-contained touch screen.

For example, the display substrate may include common electrode lines (not shown in the figure) extending along the circumferential direction of the arc and common electrodes electrically connected to the common electrode lines, and the touch screen further includes touch signal lines electrically connected to the plurality of touch electrodes. The common electrode lines are also used as the touch signal lines, and the common electrodes are also used as the touch electrodes to realize the touch and display driver integration mode. In the display stage, the common electrodes provide a reference voltage for the sub-pixels, and interact with the pixel electrodes to drive the liquid crystal to deflect, thereby realizing pixel display; and in the touch stage, the common electrodes are used as the touch electrodes for touch scanning to locate the touch point.

For example, in the display stage, the signal output terminal outputs a ground signal to the touch signal lines, and in the touch stage, the signal terminal outputs a touch signal to the touch signal lines, and an initial voltage of the touch signal is a voltage of the ground signal. There is no difference between the initial voltages on the touch signal lines in the display stage and the touch stage, the voltages on the touch signal lines will switch quickly at the same time of switching between the display stage and the touch stage, thereby avoiding unstable voltage and improving display and touch effects.

For example, the electronic device including the display substrate as mentioned above can be a liquid crystal display device, and the liquid crystal display device further includes a liquid crystal layer and an opposing substrate located on a side of the liquid crystal layer away from the base substrate. Both the touch electrodes and the pixel electrodes are located on the base substrate, that is, the touch electrodes are located between the base substrate and the liquid crystal layer. For example, touch electrodes, touch signal lines, pixel electrodes, etc. can be arranged on the base substrate facing the liquid crystal layer, and the touch signal lines are located on a side of the touch electrodes facing the base substrate, and the touch electrodes are electrically connected to corresponding touch signal lines through via holes in an insulating layer between the touch electrodes and the touch signal lines. The touch screen in the embodiment of the present disclosure is embedded in the display substrate, so that the electronic device can be thinner and lighter.

Because the common electrode lines in the electronic device in the embodiment of the present disclosure are also used as the touch signal lines and the common electrodes are also used as the touch electrodes, the arrangement of the touch electrodes depends on the arrangement of the sub-pixels. For example, in the case where the arrangement of the sub-pixels is as shown in FIG. 2 (for example, matrix arrangement), the arrangement of the touch electrodes needs to be as shown in FIG. 1 or FIG. 4. In the case where the arrangement of the touch electrodes is as shown in FIG. 10 (for example, circular arrangement), the arrangement of the touch electrodes needs to be the arrangement as shown in FIG. 9.

For example, the embodiments of the present disclosure are not limited to the display substrate being a liquid crystal display substrate. In the case where the display substrate is an organic light-emitting diode display substrate, the organic light-emitting diode display substrate may include a base substrate, an organic light-emitting diode located on the base substrate, and an encapsulation layer located on a side of the organic light-emitting diode away from the base substrate, and the touch screen may be located on the encapsulation layer.

For example, the electronic device provided by the embodiment of the present disclosure may be a display device, such as a liquid crystal display device and an organic light-emitting diode (OLED) display device, etc.

For example, the electronic device provided by the embodiment of the present disclosure can be applied to a vehicle-mounted display touch device, and a central control knob is arranged in the non-display region in the middle of the annular touch screen, and the display screen with the touch function surrounds the central control knob.

For example, the electronic device provided by the embodiment of the present disclosure can also be applied to an intelligent audio, and a loudspeaker can be arranged in the non-display region in the middle of the annular touch screen, and the display screen with the touch function is arranged around the speaker.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

The foregoing is merely exemplary embodiments of the present disclosure, but is not used to limit the protection scope of the present disclosure. The protection scope of the present disclosure shall be defined by the attached claims.

What is claimed is:

1. An electronic device, comprising:
a touch screen, comprising a special-shaped touch region which comprises a plurality of touch electrodes; and
a display substrate, comprising a base substrate and a plurality of sub-pixels on the base substrate,
wherein the plurality of touch electrodes comprise a plurality of first touch electrodes on a non-edge region of the special-shaped touch region and a plurality of second touch electrodes on an edge region of the special-shaped touch region, first edges of the plurality of second touch electrodes coincide with an edge of the special-shaped touch region, and an area ratio of each of the second touch electrodes to each of the first touch electrodes ranges from 0.9 to 1.1;
the display substrate comprises a special-shaped display region, and an orthographic projection of the special-shaped display region on the base substrate coincides with an orthographic projection of the special-shaped touch region on the base substrate;
the plurality of touch electrodes further comprise a plurality of third touch electrodes, an area ratio of each of the third touch electrodes to each of the first touch electrodes ranges from 0.9 to 1.1, and the plurality of third touch electrodes are between a part of the plurality of first touch electrodes and a part of the plurality of second touch electrodes; and
a shape of at least one of the plurality of first touch electrodes is different from that of at least one of the plurality of third touch electrodes.

2. The electronic device according to claim 1, wherein a shape of the special-shaped touch region comprises a circle, a ring or a polygon except a rectangle.

3. The electronic device according to claim 2, wherein the plurality of sub-pixels are arranged in an array along a first direction and a second direction, and the first direction intersects the second direction; and
in each touch electrode, a ratio of a size along the first direction to a size along the second direction ranges from 9/11 to 11/9.

4. The electronic device according to claim 3, wherein a shape of each of the sub-pixels is a rectangle, and two adjacent edges of each of the sub-pixels, which has a shape of rectangular, extend along the first direction and the second direction, respectively.

5. The electronic device according to claim 3, wherein a shape of each of the first touch electrodes is a square, and two adjacent edges of the square extend along the first direction and the second direction, respectively; and a shape of each of the third touch electrodes is a rectangle, and two adjacent edges of each of the third touch electrodes extend along the first direction and the second direction, respectively.

6. The electronic device according to claim 5, wherein, along at least one of the first direction and the second direction, an edge length of each of the plurality of first touch electrodes is an integer multiple of an edge length of each of the plurality of sub-pixels, and each of the plurality of first touch electrodes covers some of the plurality of sub-pixels.

7. The electronic device according to claim 3, wherein each of the second touch electrodes further comprises a second edge extending along the first direction and a third edge extending along the second direction.

8. The electronic device according to claim 7, wherein at least one of the plurality of second touch electrodes has a shape of non-rectangular.

9. The electronic device according to claim 7, wherein the first edge of at least one of the plurality of second touch electrodes has a shape of an arc or a straight line segment, and the straight line segment is not perpendicular to either the second edge or the third edge.

10. The electronic device according to claim 3, wherein a part of the plurality of first touch electrodes and a part of the plurality of third touch electrodes are arranged along at least one of the first direction and the second direction.

11. The electronic device according to claim 10, wherein the display substrate comprises a plurality of common electrodes and common electrode lines electrically connected to respective common electrodes, respectively;
the touch screen further comprises touch signal lines electrically connected to respective touch electrodes, respectively; and
the common electrodes are also used as the touch electrodes, and the common electrode lines are also used as the touch signal lines.

12. The electronic device according to claim 11, wherein the touch signal lines extend along the first direction, and an orthographic projection of a touch signal line, which is connected to a touch electrode, on the base substrate overlaps with an orthographic projection of the touch electrode on the base substrate.

13. The electronic device according to claim 12, wherein at least one of the plurality of touch electrodes comprises a main body portion and a protrusion, and an orthographic projection of the protrusion on the base substrate overlaps with an orthographic projection of a corresponding touch signal line on the base substrate, so that the protrusion is electrically connected to and the touch signal line.

14. The electronic device according to claim 13, wherein a touch signal line, which overlaps with the main body portion, is insulated from the main body portion.

15. The electronic device according to claim 1, wherein shapes of respective first touch electrodes are identical, and areas of the respective first touch electrodes are equal.

16. An electronic device, comprising:
a touch screen, comprising a special-shaped touch region which comprises a plurality of touch electrodes; and
a display substrate, comprising a base substrate and a plurality of sub-pixels on the base substrate,
wherein the plurality of touch electrodes comprise a plurality of first touch electrodes on a non-edge region of the special-shaped touch region and a plurality of second touch electrodes on an edge region of the special-shaped touch region, first edges of the plurality of second touch electrodes coincide with an edge of the special-shaped touch region, and an area ratio of each of the second touch electrodes to each of the first touch electrodes ranges from 0.9 to 1.1; the display substrate comprises a special-shaped display region, and an orthographic projection of the special-shaped display region on the base substrate coincides with an orthographic projection of the special-shaped touch region on the base substrate;
a shape of the special-shaped touch region comprises a circle, a ring or a polygon except a rectangle,
wherein the edge of the special-shaped touch region has a shape of an arc, the plurality of sub-pixels are uniformly arranged along a circumferential direction of the arc, and the plurality of first touch electrodes and the plurality of second touch electrodes are both uniformly arranged along the circumferential direction of the arc.

17. The electronic device according to claim 16, wherein each of the touch electrodes comprises a first edge extending along the circumferential direction of the arc and a second edge extending along a radial direction of the arc.

* * * * *